United States Patent
Silvagi et al.

(10) Patent No.: US 6,691,573 B2
(45) Date of Patent: Feb. 17, 2004

(54) PORTABLE VEHICLE TESTING ENVIRONMENT

(75) Inventors: Frank Silvagi, Sterling Heights, MI (US); Jeffrey Peters, Lake Orion, MI (US); Robert Shiloff, White Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/111,687

(22) PCT Filed: Sep. 10, 2001

(86) PCT No.: PCT/US01/28287

§ 371 (c)(1),
(2), (4) Date: Sep. 9, 2002

(87) PCT Pub. No.: WO02/23149

PCT Pub. Date: Mar. 21, 2002

(65) Prior Publication Data

US 2003/0221487 A1 Dec. 4, 2003

Related U.S. Application Data

(60) Provisional application No. 60/231,927, filed on Sep. 11, 2000.

(51) Int. Cl.$^7$ ................................................ G01M 7/00
(52) U.S. Cl. .............................. 73/571; 73/487; 73/462
(58) Field of Search .......................... 73/462, 457, 487, 73/571, 593, 865.6

(56) References Cited

U.S. PATENT DOCUMENTS

| | | |
|---|---|---|
| 3,903,738 A | 9/1975 | Malchow |
| 3,940,978 A | 3/1976 | Akkerman et al. |
| 3,948,106 A | 4/1976 | Armbruster |
| 3,950,987 A | 4/1976 | Slezinger et al. |
| 4,647,208 A | 3/1987 | Bieman |
| 4,653,324 A | 3/1987 | Nugier |
| 4,653,346 A | 3/1987 | Kato et al. |
| 4,884,653 A | 12/1989 | Kouno |
| 4,885,707 A | 12/1989 | Nichol et al. |
| 4,898,026 A | 2/1990 | Damitz |
| 4,939,985 A | 7/1990 | Von Thun |
| 4,977,516 A | 12/1990 | Shepherd |
| 4,987,967 A | 1/1991 | Kouno |
| 5,033,292 A | 7/1991 | Dennis |
| 5,218,870 A | 6/1993 | Komurasaki et al. |
| 5,260,684 A | 11/1993 | Metzmaker |
| 5,313,407 A | 5/1994 | Tiernan et al. |
| 5,320,409 A | 6/1994 | Katoh et al. |
| 5,323,639 A | 6/1994 | Komurasaki et al. |
| 5,360,080 A | 11/1994 | Yamazaki |
| 5,365,787 A | 11/1994 | Hernandez et al. |
| 5,419,192 A | 5/1995 | Maxwell et al. |
| 5,431,049 A | 7/1995 | Kopp |
| 5,452,607 A | 9/1995 | Axtell |
| 5,465,624 A | 11/1995 | Tseytlin et al. |
| D379,599 S | 6/1997 | Dobeck et al. |
| 5,641,904 A | 6/1997 | Kopp et al. |
| 5,760,302 A | 6/1998 | Moradi et al. |
| 5,767,403 A | 6/1998 | Kopp et al. |
| 5,844,145 A | 12/1998 | D'Angelo |
| 6,119,061 A | 9/2000 | Schenkel et al. |
| 6,131,454 A | 10/2000 | Kopp et al. |

*Primary Examiner*—Richard A. Moller
(74) *Attorney, Agent, or Firm*—Brinks Hofer Gilson & Lione

(57) ABSTRACT

A mobile testing environment is adapted for detecting drive line system imbalances in an automotive vehicle and includes an enclosed trailer for providing insulation from ambient weather, temperature and noise. The trailer also has a hitch for attachment to a towing vehicle for transport. An angular position and speed sensor is adapted to generate a signal responsive to speed and angular position of a drive shaft. Vibration sensors are adapted to detect drive line vibration and generate a signal responsive thereto. A signal analyzer is adapted to receive signals generated by the angular position and speed sensor and the vibration sensors to calculate any imbalance in the drive line system and present counterbalance weight and position parameters for correcting any system imbalance. The angular sensor comprises a pair of perceptron cameras adapted to send a pair of signals to the signal analyzer.

17 Claims, 3 Drawing Sheets

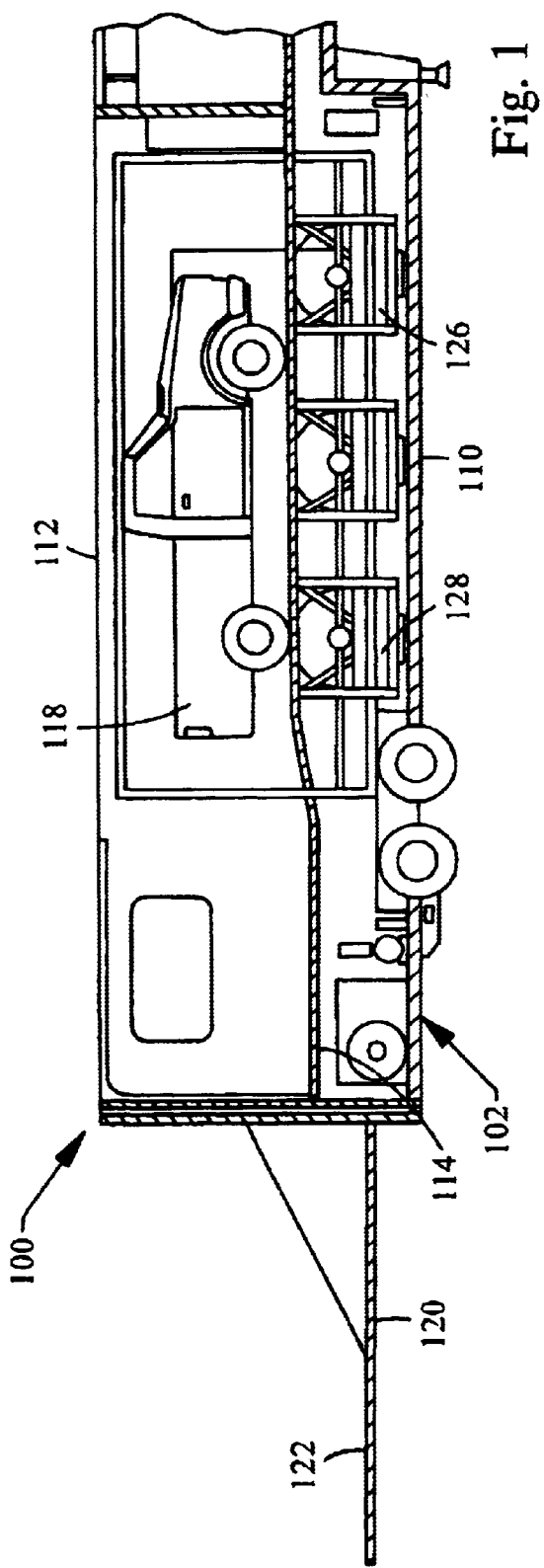
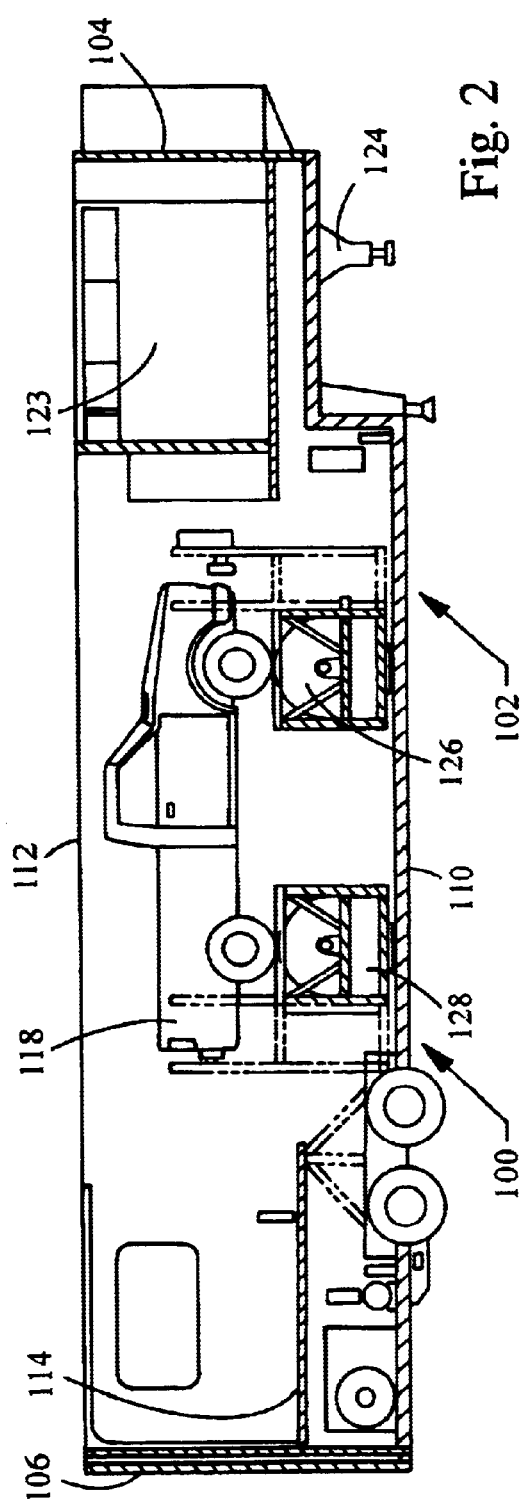

PORTABLE VEHICLE TESTING ENVIRONMENT

CROSS-REFERENCE TO RELATED APPLICATIONS

The present application claims priority to PCT application serial number PCT/US01/28287, filed on Sep. 10, 2001, entitled "Portable Vehicle Testing Environment", which claims priority to U.S. Provisional Patent Application Serial No. 60/231,927, filed Sep. 11, 2000, entitled "Portable Vehicle Testing Environment".

TECHNICAL FIELD OF THE INVENTION

The present invention generally relates to a method and transportable environment for detecting vehicle noises and vibrations in dynamic situations. More specifically, the present invention relates to a method and transportable apparatus for detecting system imbalances in a drive line assembly for an automotive vehicle in a controlled environment that is insulated from ambient temperature and noise.

BACKGROUND OF THE INVENTION

The individual components of a drive line system often include inherent or residual imbalances due to variations in manufacturing tolerances. While steps can be taken to balance the individual components, residual imbalances often still remain. When the individual components are assembled into the drive line system, the residual imbalances can "stack up" such that they combine to produce a relatively high level of imbalance. Automotive drive line systems which embody these characteristics are unacceptable because they produce drive line vibration and boom.

It is known in the related art to balance the drive line system prior to installation into the vehicle. Many fixtures are known in the art for performing this function and typically rely on vibration measuring devices physically coupled to the drive line system to identify and thereafter correct the imbalances. Still, this is often not enough to eliminate objectionable vibration in the drive line system of a fully assembled automotive vehicle. Thus, devices have been proposed in the related art which seek to identify and correct drive line system imbalances at the terminal stage of vehicle production and prior to shipment of the vehicle. However, these devices suffer from the disadvantage that an additional step in the manufacturing process must be added in order that vibration sensing instrumentation can be physically coupled to the drive line system of each vehicle. This is time consuming and labor intensive. In short, drive line system balancing as employed in the related art for a fully assembled automotive vehicle is presently not cost effective.

U.S. Pat. No. 5,641,904 to Kopp, et al, which is assigned to the assignee of the present invention and is hereby incorporated by reference into the present application, describes an apparatus which can detect and perform drive line system balancing in a fully assembled automotive vehicle in high volume production environments which is transparent to the current workload. The apparatus of the '904 patent does not rely on the physical attachment of vibration sensing instrumentation to the automotive vehicle in order to detect and correct system imbalances.

U.S. Pat. No. 6,131,454 to Kopp et al, is also assigned to the assignee of the present invention and is hereby incorporated by reference into the present application. The '454 patent describes an apparatus which can detect and perform drive line system balancing in a fully assembled automotive vehicle in high volume production environments which is transparent to the workload, just as the apparatus from the '904 patent. However, the apparatus of the '454 patent is transportable, thereby being adapted for transport to remote locations to perform on-site checks of Noise, Vibration, and Harshness ("NVH") of a rolling vehicle.

The above methods and apparatus are not adapted to provide vehicle testing in a controlled environment. Therefore, there is a need in the industry for a transportable apparatus to test drive line imbalances in an assembled automotive vehicle that provides a controlled environment to insulate the test from ambient weather, temperature and noise.

BRIEF DESCRIPTION OF THE DRAWINGS

FIG. 1 is a partial side sectional view of an environment of the present invention shown with a pivotal door in the open position;

FIG. 2 is a partial side sectional view of the environment of FIG. 1 shown with the pivoting door in the closed position and showing a control center;

DETAILED DESCRIPTION OF THE PREFERRED EMBODIMENT

Figure 3:
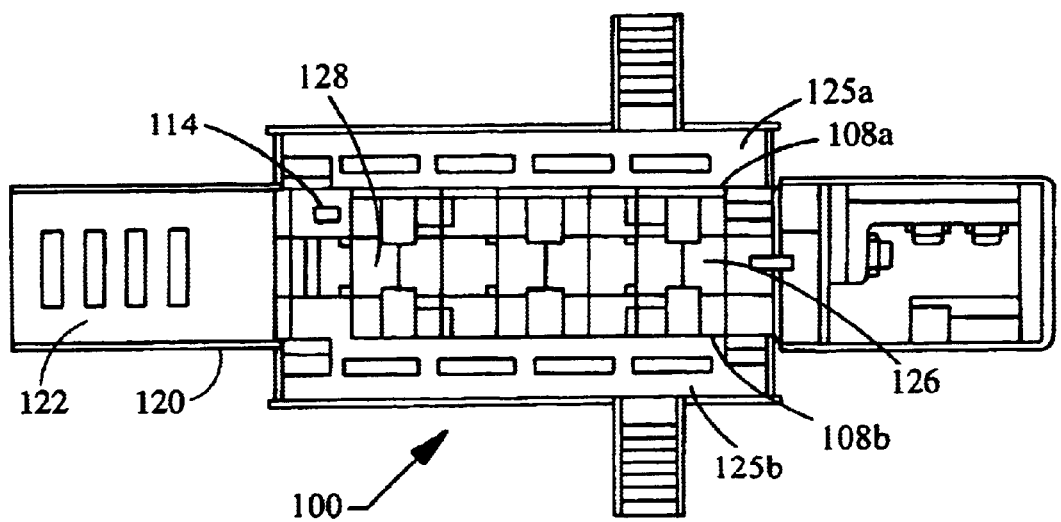
FIG. 3 is a top sectional view of the environment of FIGS. 1 and 2.

The following description of the preferred embodiment of the invention is not intended to limit the scope of the invention to this preferred embodiment, but rather to enable any person skilled in the art to make and use the invention.

Referring now to FIGS. 1 and 2, a transportable environment for detecting drive line system imbalances in an automotive vehicle according to the present invention, is generally shown at 100. The environment 100 is constructed as an enclosed trailer 102. Preferably, the enclosed trailer 102 is generally rectangular and box shaped and includes a front wall 104, a rear wall 106, two side walls 108a, 108b, a bottom 110 and a top 112. The walls 104, 106, 108a, 108b, 110, 112 of the enclosed trailer 102 are adapted to insulate the environment 100 from ambient weather, temperature and noise outside of the trailer 102. The enclosed trailer 102 further includes a support surface 114 located between the top 112 and bottom 110. The support surface 114 is adapted to receive and to support an automotive vehicle 118 that is being tested.

Preferably, the rear wall 106 includes a pivoting door 120 which opens outward from the rear wall 106. In the preferred embodiment, the pivoting door 120 is mounted pivotally to a lifting device (not shown) which is mounted onto the rear wall 106 of the enclosed trailer 102. When the pivoting door 120 is open, an interior surface of the pivoting door 120 presents a loading surface 122 adapted to support the automotive vehicle 118. The lifting device is adapted to lift the pivoting door 120 vertically upward until the loading surface 122 is even with the support surface 114 within the environment 100, thereby allowing the automotive vehicle 118 to be moved from the loading surface 122 onto the support surface 114.

The environment 100 preferably includes a control center 123. The control center 123 houses electronic equipment and provides a location for an operator to conduct testing while being sheltered from ambient weather and temperature conditions while also isolating the operator from the controlled testing environment.

Preferably, the environment 100 is adapted to be towed by a truck. The environment 100 includes a hitch 124 at a front end for attachment to a towing vehicle (not shown). The environment 100 further includes a hydraulic lift (not shown) for supporting the front end of the environment 100 while the automotive vehicle 118 is being tested.

Referring to FIG. 3, the environment 100 preferably includes a pair of extending sections 125a, 125b which are adapted to telescope into the side walls 108a, 108b to extend into the environment 100 over the support surface 114 when the environment 100 is not in use, or being towed between remote locations. For testing, the extending sections 125a, 125b telescope outward from the side walls 108a, 108b to enlarge the inner space of the environment 100.

Preferably, the support surface includes a pair of chassis dynamometers 126, 128 mounted within the support surface 114 and adapted to support the automotive vehicle 118 while the chassis dynamometers 126, 128 are operatively engaged by driven wheels of the automotive vehicle 118. Preferably, a first chassis dynamometer 126 is positioned to be operatively engaged with the front wheels of the automotive vehicle 118 and a second chassis dynamometer 128 is positioned to be operatively engaged with the rear wheels of the automotive vehicle 118. In this way, the environment 100 can accommodate four wheel drive vehicles, and conduct drive line testing with all four wheels in motion.

Preferably, the second chassis dynamometer 128 is moveable along a longitudinal axis of the enclosed trailer 102. In this way, the distance between the first and second chassis dynamometers 126, 128 can be adjusted to accommodate vehicles with varying wheel base lengths. In the preferred embodiment, the second chassis dynamometer 128 is moveable to accommodate vehicle having a wheel base length of approximately 90 inches up to approximately 176 inches.

Figure 4:
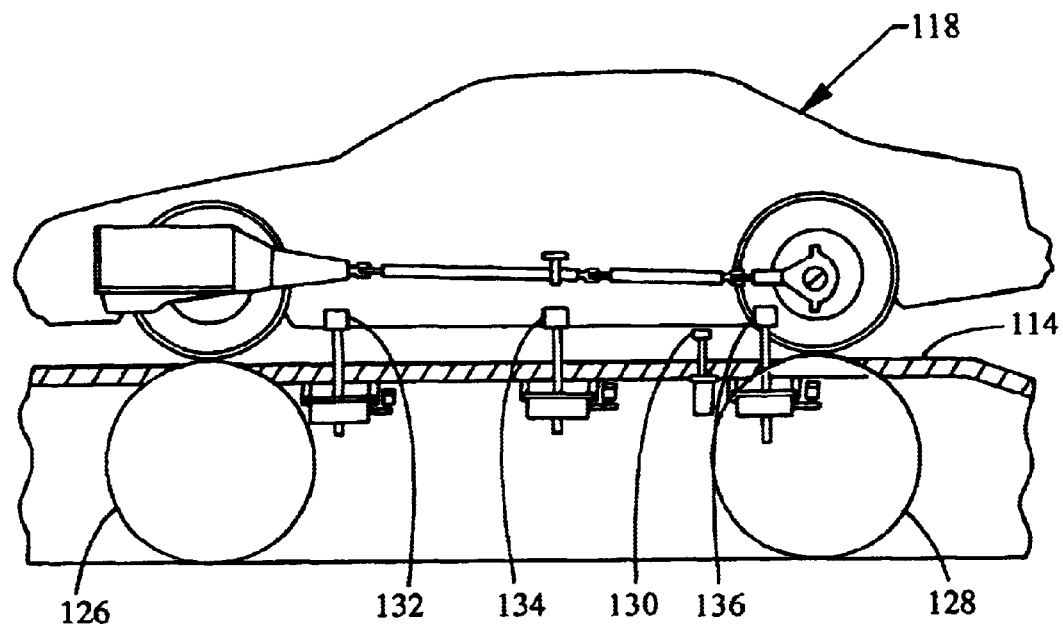
FIG. 4 is a side sectional view of a portion of a support surface of the present invention shown with an automotive vehicle thereon.

Referring to FIG. 4, the environment 100 also includes an angular position and speed sensor 130 which is located at a preselected position spaced from, but associated with, a drive shaft of the automotive vehicle 118 in non-contacting relationship therewith. More specifically, the angular position and speed sensor is a fiber optic tachometer 130 which monitors the angular position and speed of the drive shaft relative to a preselected reference point thereon. The preselected reference point may be a paint strip, reference sticker or any other suitable device employed to indicate the reference point on the drive shaft. The fiber optic tachometer 130 generates a signal responsive to the speed and angular position of the drive shaft relative to the preselected reference point thereon.

In addition, the environment 100 includes at least one but preferably three vibration sensors 132, 134, 136 located at a preselected position, spaced from, but associated with, the drive line of the automotive vehicle 118 in non-contacting relationship therewith. More specifically, the environment 100 includes a vibration sensor 132 which is located in a preselected position spaced from, but in non-contacting relationship with a transmission so as to sense the vibration from the transmission and generate responsive signals. The vibration sensor 132 is specifically disposed in non-contacting relationship with a transmission extension.

The environment 100 may also include a vibration sensor 134 which is located at a preselected position spaced from, but in non-contacting relationship with, a center bearing of the automotive vehicle 118. In this way, the vibration sensor 134 may sense the vibration from the center bearing and generate signals responsive thereto. Furthermore, the environment 100 may also include a vibration sensor 136 which is located at a preselected position spaced from, but in non-contacting relationship with, an axle of the automotive vehicle 118 so as to sense the vibration from the axle and generate responsive signals. The vibration sensor 136 is specifically disposed in non-contacting relationship with respect to a pinion nose of the axle.

The non-contacting vibration sensors 132, 134, 136 preferably comprise either a laser vibrometer, deflectometer or microwave sensor. The laser vibrometer, deflectometer and microwave sensors send energy in either a beam or a wave directed at the drive train and measure the highest point of vibration in a single plane at each of the three points discussed above. More specifically, any of the sensors 132, 134, 136 can be employed to measure the highest point of displacement, velocity or acceleration at the points mentioned. From this information, the vibration and any imbalance can be determined.

Figure 5:
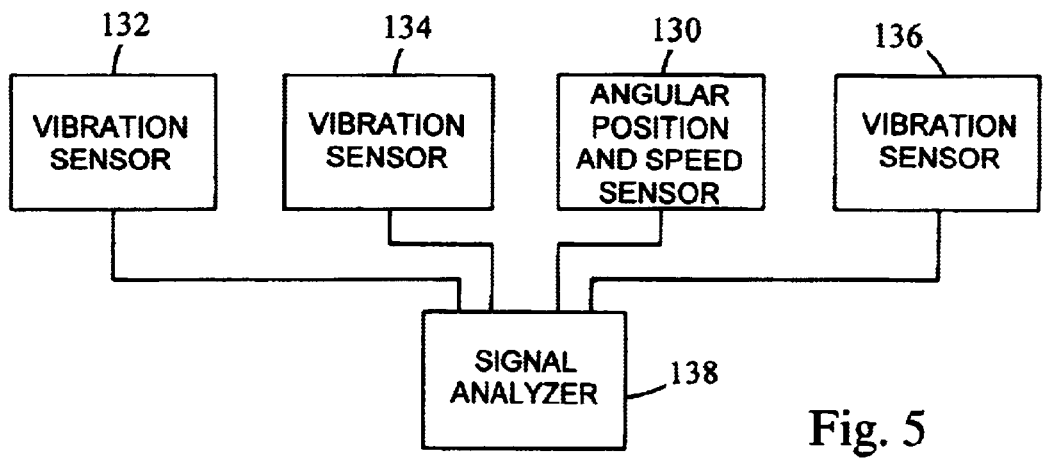
FIG. 5 is a schematic diagram showing sensors and a signal analyzer of the present invention.

Referring to FIG. 5, the environment 100 further includes a signal analyzer 138 which receives the signals generated by the fiber optic tachometer 130 as well as the vibration sensors 132, 134, 136 and calculates any imbalance in the drive line system and presents counterbalance weight and position parameters for correcting any system imbalance.

The environment 100 also includes a sensor position actuator associated with each sensor 130, 132, 134, 136. The actuator locates the fiber optic tachometer 130 as well as the vibration sensors 132, 134, 136 in a proper position relative to a preselected point on the drive line. The sensors 130, 132, 134, 136 are operatively moveable between a first position below the support surface 114 and a second, preselected position raised from the support surface 114 and spaced from, but associated with, the drive line system in non-contacting relationship as noted above. Additionally, the sensors 130, 132, 134, 136 are operatively moveable along the longitudinal axis of the enclosed trailer 102.

Sometimes it is desirable to perform remote NVH analysis at a dealership, remote vehicle test site, or a race track and be able to insulate the test from ambient weather, temperature and noise, which could affect the capability of the testing. In operation, the environment 100 is taken to a remote site, then the automotive vehicle 118 is driven onto the support surface until the front and rear wheels of the automotive vehicle 118 are supported by the first and second chassis dynamometers 126, 128 respectively. The automotive vehicle 118 is accelerated to find its neutral running position. The sensors 130, 132, 134, 136 are then moved from their first position below the support surface 114 to their second preselected position spaced from, in non-contacting relationship with respect to the drive line system of the automotive vehicle 118. The speed of the automotive vehicle 118 is adjusted to a predetermined value and the sensors 130, 132, 134, 136 generate signals corresponding to the angular position and speed of the drive shaft as well as the vibration in the drive line system, respectively. The signals are then received by the signal analyzer 138 and any imbalance in the drive line system is calculated, in part, by comparing the signals generated by the sensors 130, 132, 134, 136 with influence coefficient data. The influence coefficient data may be generated for any specific drive train for any given vehicle and gives base line information as a reference for calibrating the drive train system imbalance. Once this comparison is complete, the environment 100 presents counterbalance weight and position parameters for correcting any system imbalance.

The environment 100 of the present invention could also include driveline alignment detectors. Such detectors may include lasers to detect the vertical and/or lateral position of the driveshaft, driveshaft bearings, axle pinion, and/or transmission, and calculate the relative angles therebetween. Such detectors are mounted in a moveable manner similar to the sensors 130, 132, 134, 136 described above.

Figure 6:
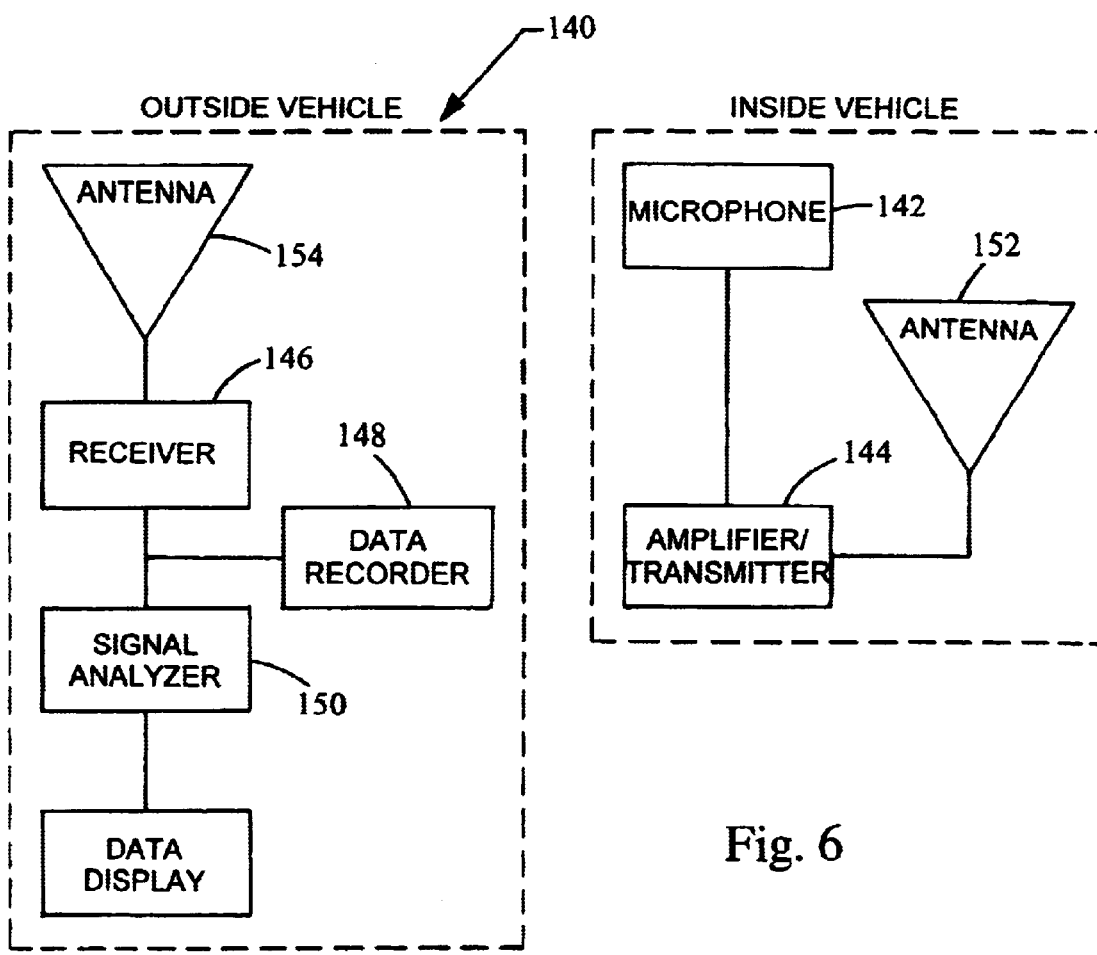
FIG. 6 is a schematic diagram showing audio equipment used in the environment of the present invention.

Referring to FIG. 6, further analysis of the NVH of the automotive vehicle 118 is performed using an audio detection system 140. The system 140 includes a microphone 142, preferably worn by an operator (not shown) who drives the vehicle within the environment 100. Alternatively, the microphone 142 may be positioned within the automotive vehicle 118, such as by pinning the microphone 142 to the seat near where a driver's ear would be positioned. The microphone 142 picks up a sound pressure signal produced by the vehicle 118. In a preferred embodiment, the system 140 includes a telemetry transmitter 144 and receiver 146, so the signal picked up by the microphone 142 can be transmitted to a recorder 148 and analyzer 150 without hard wires. Thus, the microphone 142 is inside the vehicle 118 and the door is closed without the wire being trapped by the door. This facilitates expedient testing and avoids damage to the vehicle 118 and the equipment of the system 140. With the telemetry system 140, an antenna 152, 154 is provided each at the transmitter 144 and at the receiver 146. In the preferred embodiment, the system 140 transmits broad band radio waves through the window glass as described above. The recorded sound waves are generally within the range of 0–22 KHz.

In the manner described above, drive line system vibration balancing and alignment may be performed in a fully assembled automotive vehicle 118 in controlled environment, insulated from ambient weather, temperature and noise, at a remote site, in a way which is substantially transparent to the customer and the evaluation may be performed quickly and accurately by a technician. In addition, drive line system balancing and alignment may be performed without the physical attachment of any vibration sensing instrumentation to the automotive vehicle in order to detect and correct system imbalances. Finally, data acquisition may be performed to obtain empirical data for vehicle analysis and documentation.

One skilled in the art further recognizes that although the description has been directed to driveline vibrations, the environment described above is useful for many other dynamic vehicle diagnostics. These include tire/wheel vibration, engine noise, exhaust noise, transmission/axle gear noise, transfer case operation, ABS and other brake functions, squeaks and rattles, and other dynamic vehicle functions. Furthermore, one skilled in the art would appreciate that cam plates could be added to the dynamometers 126, 128 to add simulated road inputs to induce squeaks and rattles.

The foregoing discussion discloses and describes a preferred embodiment and a method of the present invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A mobile environment adapted for detecting drive line system imbalances in an automotive vehicle, said apparatus comprising:

an enclosed trailer having a hitch for attachment to a towing vehicle for transporting said environment, said enclosed trailer having walls adapted to provide a controlled environment for conducting drive line system testing, whereby said controlled environment is substantially insulated from outside temperature and noise;

an angular position and speed sensor located at a position spaced from, but associated with, a drive shaft of a drive line system in a non-contacting relationship therewith, said sensor adapted to generate a signal responsive to speed and angular position of the drive shaft relative to a preselected reference point thereon;

at least one vibration sensor located at a position spaced from, but associated with, the drive line system in non-contacting relationship therewith, said at least one vibration sensor adapted to detect drive line vibration and generate a signal responsive thereto;

an angular sensor for detecting an angular alignment of the drive line system;

a signal analyzer adapted to receive signals generated by said angular position and speed sensor and said at least one vibration sensor and to calculate any imbalance in the drive line system and present counterbalance weight and position parameters for correcting any system imbalance;

wherein said angular sensor comprises a pair of perceptron cameras adapted to send a pair of signals to said signal analyzer to determine the angular alignment of the drive line system and calculate a corrective shim thickness between a center bearing and the automotive vehicle.

2. The environment of claim 1 wherein said enclosed trailer is generally rectangular and box shaped with a front wall, a rear wall, two side walls, a bottom, a top, and a support surface disposed between said bottom and said top, said rear wall including a pivoting door which opens outward from said rear wall to allow an automotive vehicle to be inserted within said enclosed trailer.

3. The environment of claim 2 wherein said pivoting door is mounted to a lifting device such that when said pivoting door is open an inner surface of said pivoting door provides a substantially horizontal loading surface adapted to support an automotive vehicle, said lifting device adapted to lift the automotive vehicle vertically up until said loading surface is aligned with said support surface, thereby allowing the automotive vehicle to be moved from said loading surface onto said support surface.

4. The environment of claim 2 wherein said support surface includes a first chassis dynamometer mounted within said support surface and adapted to support the automotive vehicle while said first chassis dynamometer is operatively engaged by drive wheels of the automotive vehicle.

5. The environment of claim 1 wherein said support surface includes a second chassis dynamometer mounted within said support surface and adapted to support the automotive vehicle while said first chassis dynamometer is operatively engaged by front drive wheels of the automotive vehicle and said second chassis dynamometer is operatively engaged by rear drive wheels of the automotive vehicle, thereby allowing four-wheel drive vehicles to be tested within said environment.

6. The environment of claim 1 wherein said second chassis dynamometer is moveable along a longitudinal axis of said enclosed trailer to allow the distance between said first and second chassis dynamometers to be adjustable, thereby allowing said environment to be adapted to vehicles of varying length.

7. The environment of claim 1 wherein said second of said pair of chassis dynamometers is moveable such that said environment can accommodate vehicles having a wheel base from approximately 90 inches up to approximately 176 inches.

8. The environment of claim 1 wherein said enclosed trailer includes a control center for housing said signal analyzer, said control center being isolated from said controlled environment to allow an operator to facilitate testing of an automotive vehicle outside of the controlled environment.

9. The environment of claim 2 wherein said side walls of said enclosed trailer include extending sections adapted to telescope into said side walls and extend into said controlled environment when said environment is being transported and to extend outward from said side walls to enlarge the environment when testing is being conducted.

10. A method of detecting drive line system imbalances in an automotive vehicle, said method including:
providing a transportable environment which is adapted for detecting drive line system imbalances in an automotive vehicle;
  transporting the environment to a location to test vehicles;
  positioning an automotive vehicle within the transportable environment;
  substantially sealing the environment to insulate the environment from outside weather, temperature and noise;
  generating a signal in response to an angular position and speed of a drive shaft of the drive line system;
  detecting vibration in the drive line system and generating a signal corresponding thereto;
  determining an angular relationship of the driveline to the vehicle; and
  calculating any imbalance in the drive line system based on the signals of the angular position and speed as well as the detected vibration and determining a corrective counterweight and position thereof to substantially eliminate any system imbalance.

11. The method of claim 10 wherein said transportable environment comprises:
  an enclosed trailer being generally rectangular and box shaped with a front wall, a rear wall, two side walls, a bottom, a top, a first support surface disposed between the bottom and the top, a hitch for attachment to a towing vehicle and being adapted to provide a controlled environment for conducting drive line system testing, whereby the controlled environment is insulated from ambient temperature and noise;
  an angular position and speed sensor located at a position spaced from, but associated with, a drive shaft of a drive line system in a non-contacting relationship therewith, the sensor being adapted to generate a signal responsive to speed and angular position of the drive shaft relative to a preselected reference point thereon;
  at least one vibration sensor located at a position spaced from, but associated with, the drive line system in non-contacting relationship therewith, the at least one vibration sensor being adapted to detect drive line vibration and generate a signal responsive thereto;
  an angular sensor for detecting an angular alignment of the drive line system;
  a signal analyzer adapted to receive signals generated by the angular position and speed sensor and the at least one vibration sensor and to calculate any imbalance in the drive line system and present counterbalance weight and position parameters for correcting any system imbalance;
  said angular sensor comprising a pair of perceptron cameras which are adapted to send a pair of signals to the signal analyzer to determine the angular alignment of the drive line system and calculate a corrective shim thickness between a center bearing and the automotive vehicle.

12. The method of claim 11 wherein the first support surface includes a first chassis dynamometer mounted within the support surface and being adapted to support the automotive vehicle, wherein positioning an automotive vehicle within the transportable environment includes operatively engaging said first chassis dynamometer with drive wheels of the automotive vehicle.

13. The method of claim 12 wherein the support surface further includes a second chassis dynamometer mounted within the support surface and being adapted to support the automotive vehicle, wherein positioning an automotive vehicle within the transportable environment includes operatively engaging the first chassis dynamometer with front drive wheels of the automotive vehicle and operatively engaging the second chassis dynamometer with rear drive wheels of the automotive vehicle.

14. The method of claim 13 wherein the second chassis dynamometer is moveable along a longitudinal axis of the enclosed trailer to allow the environment to be adapted to vehicles of varying length wherein operatively engaging the first chassis dynamometer with front wheels of the automotive vehicle and operatively engaging the second chassis dynamometer with rear wheels of the automotive vehicle includes determining a wheel base length of the vehicle to be tested and moving the second chassis dynamometer to the appropriate distance from the first chassis dynamometer such that when the front wheels of the automotive vehicle are positioned on the first chassis dynamometer the rear wheels of the automotive vehicle are positioned on the second chassis dynamometer.

15. The method of claim 11 wherein generating a signal in response to an angular position and speed of a drive shaft of the drive line system and detecting vibration in the drive line system and generating a signal corresponding thereto includes moving the angular position and speed sensor and the at least one vibration sensor from a first position below the support surface to a second position above the support surface and spaced from, but associated with a driveshaft of a driveline of the vehicle in a non-contacting relationship therewith.

16. The method of claim 11 wherein the rear wall includes a pivoting door which opens outward from the rear wall to allow an automotive vehicle to be inserted within the enclosed trailer, wherein positioning an automotive vehicle within the transportable environment includes opening the pivoting door to allow the automotive vehicle to be inserted, and closing the pivoting door after the automotive vehicle has been inserted.

17. The method of claim 16 wherein the pivoting door is mounted to a lifting device such that when the pivoting door is open an inner surface of the pivoting door provides a substantially horizontal loading surface adapted to support an automotive vehicle and the lifting device is adapted to lift the automotive vehicle vertically up wherein positioning an automotive vehicle within the transportable environment further includes lifting the pivoting door vertically until the loading surface is aligned with the support surface and moving the automotive vehicle from the loading surface onto the support surface within the environment.

* * * * *

UNITED STATES PATENT AND TRADEMARK OFFICE
CERTIFICATE OF CORRECTION

PATENT NO. : 6,691,573 B2
DATED : February 17, 2004
INVENTOR(S) : Frank Silvagi et al.

Page 1 of 1

It is certified that error appears in the above-identified patent and that said Letters Patent is hereby corrected as shown below:

Column 6,
Line 59, delete "claim 1" and substitute -- claim 4 -- in its place.

Column 7,
Line 1, delete "claim 1" and substitute -- claim 5 -- in its place.
Line 7, delete "claim 1" and substitute -- claim 6 -- in its place.

Signed and Sealed this

Twenty-seventh Day of April, 2004

JON W. DUDAS
*Acting Director of the United States Patent and Trademark Office*